Patented Oct. 2, 1951

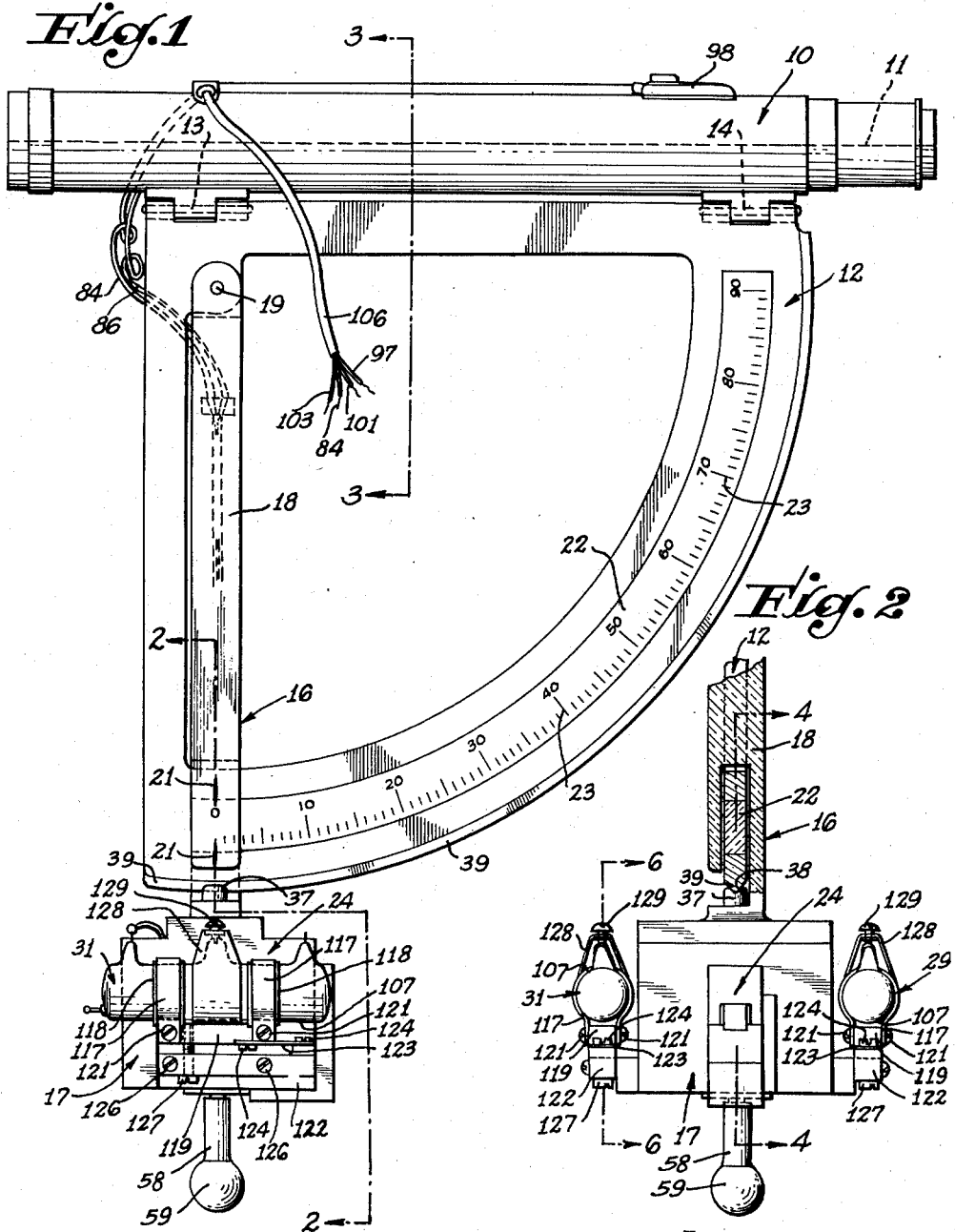

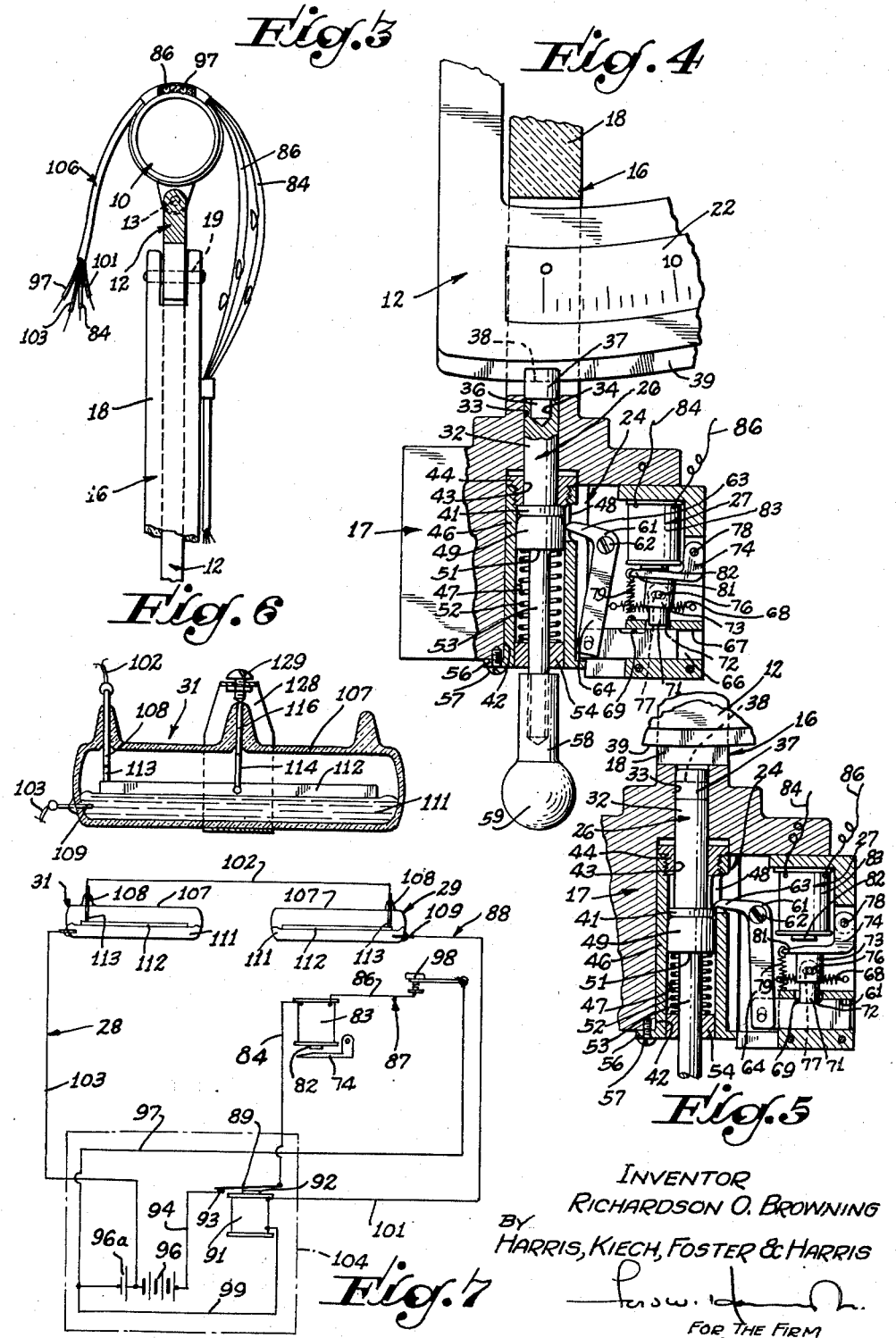

2,569,796

UNITED STATES PATENT OFFICE 2,569,796

PENDULUM INCLINOMETER FOR SIGHTING INSTRUMENTS

Richardson O. Browning, North Hollywood, Calif.

Application June 16, 1945, Serial No. 599,847

7 Claims. (Cl. 33—70)

My invention relates in general to measuring instruments and, more specifically, to an instrument whose operation is characterized by the necessity for establishing a reference line which is oriented in a predetermined direction. This requirement may be satisfied by the provision of an instrument, or a component of an instrument, which is adapted for establishing the reference line when the instrument, or the component thereof, assumes a predetermined position.

Measuring devices of this general character which require the establishment of a reference line for operation thereof may include, for example, such instruments as transits, levels, sextants, etc. The operation of such instruments necessitates the establishment of a reference line which ordinarily is oriented horizontally or vertically relative to a reference plane, although intermediate orientations may also be employed. The reference plane may, for example, be a plane which traverses the center of the earth and will be considered as such herein for the purpose of disclosing the invention. The measuring instrument preferably includes a movable component which is adapted for assuming the predetermined position in response to the action of a suitable motivating agent.

For the purpose of disclosing the invention, I prefer to consider an application of the fundamental concepts thereof to an exemplary embodiment which is known in the art as a sextant. Conventional sextants include a movable component which is adapted for assuming a vertical position in response to the gravitational attraction of the earth, whereupon the reference line will lie in a vertical plane traversing the center of the earth. Many conventional sextants include a sighting tube through which an observation of a star, or other heavenly body, may be made, the movable component being pivotable relative to the sighting tube. When the movable component assumes a vertical position relative to the earth because of the action of gravity, the angle of elevation of the star may be indicated by a suitable scale. Some conventional sextants require that the angle of elevation be read by an operator while the observation is being made, an obviously unsatisfactory procedure particularly if the sextant is employed aboard a marine vessel, aircraft or any other unstable observation point. Other conventional sextants are provided with manually operable means for latching the movable component relative to the sighting tube when the observation has been made and the angle of elevation may thereafter be read with greater facility. The latter type of conventional sextant is subject to similar disadvantages in that simultaneous observation of a star and latching of the movable component are extremely difficult operations to perform with any degree of accuracy and are particularly difficult when an unstable observation point is employed. Furthermore, the results obtained from all such conventional sextants are subject to the inaccuracies inherent in human judgment, since the vertical position of the movable component must be determined by the estimate of the operator.

In view of the foregoing considerations, a primary objective of my invention is the provision of a measuring instrument which includes an automatic means for indicating to an operator thereof that the predetermined orientation of the aforesaid reference line has been established. As applied to the exemplary embodiment of my invention, the foregoing primary objective includes the provision of an automatic means for indicating that the movable component of the sextant has assumed a vertical position or orientation. Another primary objective is to provide a means for recording the position of the movable component automatically when the latter assumes the predetermined position. The recording means may include means for interrupting the motion of and securing the movable component automatically when the latter assumes the predetermined position. In the preferred embodiment described hereinafter the datum recorded is the angular variance of the line of sight of the instrument from the perpendicular, as evidenced by the position of the pendulum in relationship to the quadrant of the sextant.

I prefer to effect a realization of the foregoing primary objectives by means of the aforesaid exemplary embodiment with no intention of limiting the scope of my invention thereto. The exemplary embodiment is intended as a means for disclosing the fundamental concepts of my invention, the latter being susceptible to incorporation in various other embodiments by those proficient in the art.

The sextant preferably includes a means for defining a line of sight which is pivotally attached to a frame to permit vertical orientation of the frame in response to the action of gravity. A movable component in the form of a pendulum means is pivotally attached to the frame and is adapted for angular motion relative to the frame in response to the gravitational attraction of the earth.

In accordance with the primary objective of my invention, I contemplate the provision of means for recording the position of the pendulum relative to the frame automatically when the pendulum assumes the predetermined position. The recording means preferably includes means for interrupting the angular motion of the pendulum automatically when the latter assumes the predetermined position, the position preferably being vertical relative to the earth. The interrupting means includes a means for securing the pendulum to the frame and includes a means for actuating the securing means automatically when the pendulum assumes the desired position. The aforesaid actuating means is preferably adapted for automatic operation in response to the action of gravity when the pendulum assumes the desired position and the provision thereof is an objective of my invention.

The actuating means is preferably electrical and includes a circuit having variable characteristics, another objective of my invention being to provide a gravity responsive means for varying the characteristics of the circuit automatically as the pendulum moves angularly about the point of pivotal attachment thereof to effect automatic actuation of the securing means when the pendulum is vertical. The characteristics of the circuit may be varied by employing a circuit which is normally open, gravity responsive means being provided for closing the circuit automatically when the pendulum assumes a vertical position. The latter function is preferably performed by a gravity responsive switch and the provision thereof is a further objective of my invention.

The foregoing and various other objectives and advantages of my invention may be attained by means of the aforesaid exemplary embodiment thereof which is described in the following disclosure and shown in the accompanying drawings, which are merely for illustrative purposes, wherein:

Fig. 1 is a side elevational view of the exemplary embodiments of my invention;

Fig. 2 is a sectional view taken as indicated by the broken line 2—2 of Fig. 1;

Fig. 3 is a sectional view taken along the broken line 3—3 of Fig. 1;

Fig. 4 is a sectional view, taken as indicated by the broken line 4—4 of Fig. 2, illustrating the secured position of the aforesaid means for securing the pendulum means to the frame;

Fig. 5 is a sectional view similar to Fig. 4 illustrating the unsecured position of the securing means;

Fig. 6 is a sectional view, taken as indicated by the line 6—6 of Fig. 2, illustrating the aforesaid gravity responsive, circuit closing means; and Fig. 7 is a wiring diagram illustrating a suitable electrical circuit.

Referring to the drawings, the sextant includes a means 10 for defining a line of sight which is indicated by the dotted line 11, the means 10 being pivotally attached to a frame 12 by coaxial pivots 13 and 14 whose axes are substantially parallel to the line of sight 11. The axes of the pivots 13 and 14 need not be parallel to the line of sight 11, however, and any desired relationship may be employed. A pendulum means 16, which includes a mass, or bob 17 and a supporting member, or rod 18, is pivotally attached to the frame 12 by a pivot 19, the axis of the latter being perpendicular to the axes of the pivots 13 and 14. The rod 18 is provided with reference pointers 21 thereon which are adapted to define a reference line, the reference pointers 21 being adapted for registry with an arcuate angular scale 22 which is mounted on the frame 12 and is provided with indicia 23 thereon for indicating angular displacement of the pendulum means 16 relative to the frame 12. The 0° index on the scale 22 is perpendicular to the line of sight 11 and, therefore, the 90° index is parallel thereto, but, as previously indicated, any desired relationship between the 0° index and the line of sight 11 may be employed.

The foregoing components of the sextant may be operated in the conventional manner by making an observation of a star, or any other object, with the line of sight defining means 10, the latter preferably including a conventional sighting tube or telescope, having suitable peep holes, crosshairs, or the like therein (not shown) for defining the line of sight 11. In making the observation, an operator of the sextant supports the latter by the sighting tube 10, thus permitting angular motion of the frame 12 parallel to a primary plane which is perpendicular to the axes of the frame pivots 13 and 14 and parallel to the axis of the pendulum pivot 19. The pivot 19 permits simultaneous angular motion of the pendulum 16 parallel to a secondary plane which is perpendicular to the primary plane. When a condition of static equilibrium is attained, the frame 12 and pendulum 16 assume vertical positions and the secondary plane and the reference line defined by the pointers 21 also become vertical. The angle on the scale 22 indicated by the pointers 21 represents the angle of elevation of the line of sight 11 relative to the horizontal.

It will be apparent that if the observation is made from an unstable observation point, such as from an ocean-going vessel, an aircraft, or the like, a static equilibrium condition may be impossible to achieve. Similar difficulties may be encountered if an observation is attempted from a windy observation point. The operator of the sextant must rely upon his own judgment in determining the precise instant when both the frame 12 and pendulum 16 are vertically oriented, a task which requires a skillful operator even under favorable conditions.

In view of these considerations, I prefer to employ an automatic means for determining the precise moment when both the frame 12 and pendulum 16 are vertically disposed. For the purpose of simplifying the disclosure, the assumption will be made that the frame 12 is vertically disposed at all times, thus limiting the disclosure to a consideration of the pendulum 16. It will be understood, however, that the apparatus to be described may also be adapted for application to the frame 12, as will be indicated hereinafter.

In general, the automatic apparatus for determining when the pendulum 16 is vertically disposed includes means 24 for recording the position of the pendulum 16 relative to the frame 12, the means 24 being adapted for interrupting the angular motion of the pendulum 16 in the exemplary embodiment illustrated. The interrupting means 24 generally includes a means 26 for securing the pendulum 16 to the frame 12 and includes a means 27 for actuating the securing means 26 automatically when the pendulum 16 assumes a predetermined position. The actuating means 27 includes an electrical circuit 28 which is normally open and includes gravity responsive means 29 and 31 for closing the circuit 28 automatically at the proper moment.

Referring particularly to Figs. 2, 4, and 5, the securing means 26 is mounted on the pendulum bob 17 and includes a plunger 32 which is reciprocably disposed in a bore 33 in the bob 17. The upper end of the plunger 32 is provided with a bore 34 within which is inserted the stem 36 of a frame-engaging element 37, the latter having a groove 38 therein which is adapted to receive the arcuate edge 39 of the frame 12 to interrupt the angular motion of the pendulum 16 about the pivot 19. The lower end of the plunger 32, which is provided with an annular flange 41 thereon, extends into a counterbore 42 in the bob 17 through a bore 43 in an insert 44, the latter being threadedly connected to a tubular sleeve 46 which is disposed in the counterbore 42. The annular flange 41 on the plunger 32 is reciprocable within a bore 47 in the tubular sleeve 46 and is adapted for engagement with the actuating means 27 through an opening 48 in the tubular sleeve 46 as will be described in detail hereinafter. The lower end of the plunger 32 is engaged by the head 49 of a second plunger 51 the latter being reciprocable within the bore 47 in the tubular sleeve 46. The frame engaging element 37 is adapted for being urged into engagement with the edge 39 of the frame 12 by means of a spring 52 which encloses the stem 53 of the plunger 51 and is seated against the head 49 thereof, the other end of the spring 52 being seated against an insert 54 which is secured in the bore 47 in the tubular sleeve 46. The lower end of the sleeve 46 is provided with a flange 56 thereon which is secured to the bob 17 by a screw 56. The lower end of the stem 53 of the plunger 51 depends from the bob 17 and is secured to a member 58 having a knob 59 thereon to permit downward displacement of the plunger 51 by the operator of the sextant.

The securing means 26 is normally retained in the position illustrated in Fig. 5 by the actuating means 27 which will be described hereinafter. When the pendulum 16 assumes a vertical position, the actuating means 27 automatically releases the plunger 32 whereupon the spring 52 urges the frame engaging element 37 into engagement with the frame 12 to interrupt the angular motion of the pendulum 16 relative thereto. The various components of the securing means 26 are then disposed as illustrated in Fig. 4. The pendulum 16 may be released relative to the frame 12 by the simple expedient of exerting a sufficient downward force on the knob 59 to compress the spring 52 whereupon the actuating means 27 again engages the securing means 26 as illustrated in Fig. 5.

The actuating means 27 includes a latching member 61 which is pivotally attached to the bob 17 by a screw 62, the latching member 61 being provided with arms 63 and 64. The arm 63 extends through the opening 48 in the tubular sleeve 46 into engagement with the annular flange 41 on the frame engaging plunger 32. The arm 64 is pivotally attached to a member 66 which is slidably disposed in a slot 67 in the bob 17, the latching member 61 being urged into the position illustrated in Fig. 5 by a relatively light spring 68 which is secured to the arm 64 and the bob 17. The slidable member 66 is provided with a notch 69 therein which is adapted to receive a locking member 71, the latter being disposed in a slot 72 which communicates with the slot 67. The locking member 71 is attached to a projection 73 on an armature 74 by a pivot 76 which is disposed in an elongated opening 77, the armature 74 being pivotally attached to the bob 17 at 78. The locking member 71 is urged into engagement with the slidable member 66 by a relatively light spring 79 which is secured to an end 81 of the armature 74 and to the bob 17. The armature 74 is disposed adjacent the core 82 of an electromagnet 83, the latter being energizable automatically by current flowing through conductors 84 and 86, which form part of the electrical circuit 28, when the pendulum 16 assumes a vertical position as will be described hereinafter.

When the electromagnet 83 is energized, the armature 74 is attracted to the core 82 as illustrated in Fig. 4, the magnetic attraction being sufficient to overcome the relatively light spring 79. The locking member 71 simultaneously disengages the slidable member 66, thereby permitting the latching member 61 to rotate about the pivot 62 and release the securing means 26, as illustrated in Fig. 4, whereupon the latter interrupts the angular motion of the pendulum 16 as previously described. The spring 52 which urges the securing means 26 into engagement with the frame 12 is sufficiently heavy to overcome the relatively light spring 68 which normally urges the arm 63 of the latching member 61 into engagement with the flange 41 on the frame engaging plunger 32. When the engagement of the securing means 26 with the frame 12 is terminated as previously described and the electromagnet 83 is de-energized, the spring 68 urges the latching member 61 into engagement with the flange 41 of the plunger 32 and the spring 79 acts on the armature 74 to urge the locking member 71 into engagement with the slidable member 66, thus latching the securing means 26 in the position illustrated in Fig. 5.

Referring particularly to Fig. 7, the electrical circuit 28 includes a primary circuit 87 and a secondary circuit 88, both of which are normally open. The primary circuit 87 includes the electromagnet 83 and conductors 84 and 86 which were described previously. The conductor 84 is connected to the armature 89 of a relay 91 having a core 92, the armature 89 being attracted by the core 92 whenever the relay 91 is energized as will be described in detail hereinafter. The armature 89 acts as a switch in the primary circuit 87 and is adapted for engagement with a contact 93 to close the primary circuit 87 when the relay 91 is energized. The contact 93 is connected to a conductor 94 which is in turn connected to a group of batteries 96 and 96a, the latter being connected in series. A conductor 97 is connected to the group of batteries 96 and 96a and to a manually operable switch 98 which is in turn connected to the conductor 86.

It will be apparent that whenever the secondary circuit 88 is energized and the switch 98 is closed, the electromagnet 83 will be energized and will actuate the securing means 26 to interrupt angular motion of the pendulum 16 as previously described. The relay 91, which is part of the secondary circuit 88, is connected to the battery 96a by a conductor 99 and to the gravity responsive circuit closing means 29 by a conductor 101. A conductor 102 interconnects the gravity responsive circuit closing means 29 and 31, the latter means 31 being connected to the battery 96a by a conductor 103.

In the exemplary embodiment illustrated, the batteries 96 and 96a and the relay 91 are mounted in a suitable case 104 (shown in phantom) and are connected to the sextant by a cable 106 which includes the conductors 84, 97, 101, and 103 as best shown in Fig. 1. The cable 106 is preferably sufficiently long to permit considerable movement of the operator relative to the case 104 for convenience in using the sextant. The manually operable switch 98 may be conveniently mounted on the sighting tube 10 as shown in Fig. 1.

The gravity responsive circuit closing means 29 and 31, which will be described hereinafter, are mounted on the pendulum bob 17 and are adapted to close the secondary circuit 88 when the pendulum 16 assumes a vertical position, thus energizing the relay 91. The latter closes the primary circuit 87, thus energizing the electromagnet 83 and causing the actuating means 27 to actuate the securing means 26 as previously described. The switch 98 prevents actuation of the securing means 26 until the operator of the sextant has completed his observation of a star, or other object. Actuation of the securing means 26 is thus prevented by the open switch 98 until the operator of the sextant feels that a satisfactory observation has been made.

Referring particularly to Fig. 6, the gravity responsive circuit closing means or gravity responsive switch 31 includes a housing 107 into which extend primary and secondary contacts 108 and 109, respectively, the primary contact 108 being connected to the conductor 102 and the secondary contact 109 to the conductor 103. The housing 107 is partially filled with a fluid 111 to submerge the secondary contact 109 beneath the surface thereof, the fluid 111 preferably being a conductor of electricity such as mercury. An electrical conductor 112 is supported by or floats on the mercury 111 and is provided with a pair of projections 113 and 114 thereon, the projection 113 being adapted for engagement with the primary contact 108. The projection 114 pivotally engages a rod 116 which extends into the housing 107 intermediate the ends of the floating conductor 112.

As best shown in Figs. 1 and 2, the gravity responsive switch 31 is provided with bands 117 which encircle the housing 107 and are preferably separated therefrom by pads 118. The encircling bands 117 are secured to a supporting member 119 by screws 121, the supporting member 119 being attached to a mounting member 122 by a leaf spring 123 which is secured by screws 124. The mounting member 122 is attached to the pendulum bob 17 by screws 126 and is provided with an adjusting screw 127 therethrough which is adapted for engagement with the supporting member 119 to effect adjustment of the position of the gravity responsive switch 31 relative to the bob 17, such adjustment being permitted by the leaf spring 123. The function of the adjusting screw 127 is to vary the position of the gravity responsive switch 31 so that the projection 113 on the floating conductor 112 engages the primary contact 108 when the pendulum 16 assumes a vertical position.

It will be apparent that as the pendulum 16 is displaced angularly in one direction, the floating conductor 112 will engage the primary contact 108 to close the switch 31 because of the action of gravity thereon and on the mercury 111. If the pendulum 16 is displaced angularly in the opposite direction, the floating conductor 112 will disengage the primary contact 108 to open the switch 31. As indicated in Fig. 7, the construction of the gravity responsive switch 29 is identical to that of the switch 31 except that the orientation thereof relative to the bob 17 is reversed, the axes of rotation of the floating conductors 112 of both switches 29 and 31 being substantially parallel to the axis of rotation of the pendulum 16 about the pivot 19. It will be apparent that if the pendulum 16 is displaced angularly in one direction from the vertical, the switch 29 will be open and the switch 31 will be closed, and if the pendulum 16 is displaced in the opposite direction, the reverse will obtain. Both switches 29 and 31 will be closed only when the pendulum 16 assumes a vertical position and since the switches 29 and 31 are connected in series by the conductor 102, the secondary circuit 88 will be closed only when such a vertical position is assumed by the pendulum 16. When the secondary circuit 88 is closed in this manner and the manually operable switch 98 in the primary circuit 87 is closed by the operator of the sextant, the actuating means 27 will actuate the securing means 26 to secure the pendulum 16 relative to the frame 12 automatically. The angle of elevation of the line of sight 11 may then be determined readily and accurately by means of the reference pointers 21 and scale 22.

Considering the actual case wherein the frame 12 is not vertically disposed at all times and is free to move angularly about the pivots 13 and 14 an additional pair of gravity responsive switches (not shown) may be attached to the pendulum bob 17 and connected in series with the switches 29 and 31. The additional switches should be mounted with the axes of rotation of the floating conductors thereof substantially perpendicular to the axis of rotation of the pendulum 16 about the pivot 19. The additional switches thus will be perpendicular to the switches 29 and 31, thereby permitting actuation of the securing means 26 only when both the frame 12 and pendulum 16 are vertically disposed. If desired, however, the sextant may be employed with only the switches 29 and 31 in operation, it then being necessary for the operator to determine when the frame 12 is vertical by estimate.

Instead of employing the conductive properties of the fluid 111 for effecting electrical communication between the secondary contact 109 and floating conductor 112 as previously discussed, the alternative construction illustrated in Fig. 6 may be employed. The housing 107 of the gravity responsive switch 31 is provided with an encircling band 128 through which is threaded a screw 129 which serves as the secondary contact, the latter being adapted for engagement with the pivot rod 116. Electrical communication between the secondary contact 129 and the floating conductor 112 is thus effected by means of the projection 114 and pivot rod 116, the operation of the alternative construction being similar to that previously discussed. In this construction, the fluid 111 need not be a conductor of electricity.

From the foregoing considerations, it will be apparent that the securing means 26 will be actuated by the actuating means 27 to secure the pendulum 16 to the frame 12 automatically when the pendulum 16 assumes a vertical position and when the manually operable switch 98 is closed. Thus, in making an observation, the operator of the sextant merely closes the switch 98 when a satisfactory observation is made and need maintain the observation only long enough to permit the gravity responsive switches 29 and 31 to close. The latter will close automatically when the pendulum 16 reaches a vertical position (assuming that the frame 12 is vertically disposed) and it is unnecessary to maintain the observation until a condition of static equilibrium of the pendulum 16 is attained. My invention thus appreciably shortens the length of time required for making an observation and materially increases the accuracy thereof since the indication is obtained automatically before the pendulum 16 comes to rest or becomes static. As previously indicated, additional gravity responsive switches may be connected in series with the switches 29 and 31 to prevent closure of the secondary component 88 of the electrical circuit 28 until both the frame 12 and pendulum 16 assume vertical positions.

The sextant may be employed to make an observation from an unstable point with facility and with a high degree of accuracy. Since maintenance of the observation until static equilibrium of the frame 12 and pendulum 16 is attained is unnecessary, the operator of the sextant will not tire as rapidly as when employing conventional sextants wherein maintenance of the observation until equilibrium is attained is essential. The shorter observation time thus materially improves the accuracy of the observation in view of the fact that the operator may tend to waver when making a lengthy observation. All guesswork regarding the position of the frame 12 and pendulum 16 is eliminated by the automatic operation of the securing means 26.

It will be understood that the position of the pendulum 16 relative to the frame 12 may be recorded in various manners and need not be limited to the means 24 for interrupting the angular motion of the pendulum 16 when the latter assumes a predetermined position. For example, the plunger 32 of the securing means 26 may be adapted to make the scale 22 at the proper moment instead of securing the pendulum 16 to the frame 12. The pendulum bob 17 may also be provided with a camera (not shown) which is adapted for actuation by the actuating means 27 to photograph the scale 22 automatically when the pendulum 16 assumes a predetermined position.

Although I have described an exemplary embodiment of my invention wherein the fundamental concepts thereof are applied to a sextant, I have no intention of being limited to the specific disclosures contained herein since the fundamental concepts of my invention are susceptible to incorporation in various other embodiments by those proficient in the art; I hereby reserve the right, therefore, to the protection offered by the full scope of my appended claims.

I claim as my invention:

1. In an instrument, the combination of: sighting means; pendulum means pivotally mounted on and adapted for angular motion relative to said sighting means; means for recording the position of said pendulum means relative to said sighting means; and means carried by said pendulum means for actuating said recording means automatically when said pendulum means assumes a predetermined orientation.

2. In a measuring instrument, the combination of: sighting means; a frame pivotally connected to said sighting means; a pendulum pivotally attached to said frame and adapted for angular motion relative thereto; means for recording the position of said pendulum relative to said frame; and means carried by said pendulum for actuating said recording means automatically when said pendulum assumes a predetermined orientation.

3. In a device for measuring inclination from the horizontal, the combination of: sighting means; frame means pivotally connected to said sighting means on a frame axis parallel to the axis of said sighting means, said frame means including an arcuate scale; pendulum means pivotally connected to said frame means and adapted to rotate in alignment with said scale; and means for automatically stopping movement of said pendulum means relative to said scale when said pendulum means attains a vertical position.

4. In a device for measuring inclination from the horizontal, the combination of: sighting means; frame means pivotally connected to said sighting means on a frame axis parallel to the axis of said sighting means, said frame means including an arcuate scale; pendulum means pivotally connected to said frame means on a transverse axis normal to said frame axis and adapted to rotate in alignment with said scale; and means for automatically stopping movement of said pendulum means relative to said scale when said pendulum means attains a vertical position.

5. In an instrument for measuring vertical angles, the combination of: frame means; pendulum means pivotally connected to said frame means for angular motion relative thereto; recording means including an element connected to and movable with said pendulum means and including a co-operating element connected to said frame means for recording angular positions of said pendulum means relative to said frame means; and gravity responsive means connected to and movable with said pendulum means for actuating said recording means automatically when said pendulum means assumes a predetermined orientation.

6. An instrument according to claim 5 wherein said recording means includes resilient means for biasing one of said elements toward an operative position to record the angular position of said pendulum means relative to said frame means, and includes electrically operable means for releasing said one element, said gravity responsive means including a gravity responsive switch which is connected in series with said electrically operable means and which closes automatically when said pendulum means assumes said predetermined orientation.

7. An instrument as set forth in claim 5 including sighting means connected to said frame means for establishing a line of sight perpendicular to the axis of angular motion of said pendulum means.

RICHARDSON O. BROWNING.

REFERENCES CITED

The following references are of record in the file of this patent:

UNITED STATES PATENTS

| Number | Name | Date |
| --- | --- | --- |
| 204,133 | Chandler | May 28, 1878 |
| 783,612 | Clark | Feb. 28, 1905 |
| 973,909 | Benson | Oct. 25, 1910 |
| 1,152,701 | Barresen | Sept. 7, 1915 |
| 1,308,795 | McCormack | July 8, 1919 |
| 1,314,258 | Fisher | Aug. 26, 1919 |
| 1,393,318 | Saxton | Oct. 11, 1921 |

(Other references on following page)

UNITED STATES PATENTS

| Number | Name | Date |
|---|---|---|
| 1,625,683 | Rail | Apr. 19, 1927 |
| 1,788,807 | Sperry | Jan. 13, 1931 |
| 1,823,336 | Shaknazaror | Sept. 15, 1931 |
| 1,845,889 | Schoolcraft | Feb. 16, 1932 |
| 1,851,169 | Gilbert | Mar. 29, 1932 |
| 1,955,746 | Inglis | Apr. 24, 1934 |
| 2,031,601 | Hegenberger | Feb. 25, 1936 |
| 2,105,147 | Inglis | Jan. 11, 1938 |
| 2,232,590 | Craig | Feb. 18, 1941 |
| 2,249,368 | Weckerly | July 15, 1941 |
| 2,249,369 | Williams | July 15, 1941 |
| 2,318,612 | Kothny | May 11, 1943 |
| 2,330,603 | McNally | Sept. 28, 1943 |
| 2,389,851 | Hagner | Nov. 27, 1945 |
| 2,412,831 | Owens | Dec. 17, 1946 |

FOREIGN PATENTS

| Number | Country | Date |
|---|---|---|
| 148,635 | Great Britain | July 29, 1920 |